United States Patent
Sinha et al.

(10) Patent No.: US 9,672,029 B2
(45) Date of Patent: Jun. 6, 2017

(54) DETERMINING TEST CASE PRIORITIES BASED ON TAGGED EXECUTION PATHS

(71) Applicant: VMWARE, INC., Palo Alto, CA (US)

(72) Inventors: Vineet Kumar Sinha, Bangalore (IN); Prasenjit Sarkar, Bangalore (IN); Rishi Kant Sharda, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/487,118

(22) Filed: Sep. 16, 2014

(65) Prior Publication Data

US 2016/0034375 A1   Feb. 4, 2016

(30) Foreign Application Priority Data

Aug. 1, 2014   (IN) .......................... 3791/CHE/2014

(51) Int. Cl.
*G06F 9/44*       (2006.01)
*G06F 11/36*      (2006.01)

(52) U.S. Cl.
CPC ............ *G06F 8/70* (2013.01); *G06F 11/3688* (2013.01); *G06F 11/3692* (2013.01)

(58) Field of Classification Search
CPC ..... G06F 11/3692; G06F 11/3688; G06F 8/70
USPC ........................................................ 717/124
See application file for complete search history.

(56) References Cited

U.S. PATENT DOCUMENTS

| | | | |
|---|---|---|---|
| 6,643,630 B1* | 11/2003 | Pegatoquet et al. | 706/45 |
| 2005/0144529 A1* | 6/2005 | Gotz et al. | 714/38 |
| 2007/0094189 A1* | 4/2007 | Yamamoto et al. | 706/45 |
| 2008/0114937 A1* | 5/2008 | Reid | G06F 11/3636 711/117 |
| 2008/0184206 A1* | 7/2008 | Vikutan | 717/127 |
| 2009/0138682 A1* | 5/2009 | Capps, Jr. | G06F 9/30101 712/220 |
| 2009/0199045 A1* | 8/2009 | Kasubuchi et al. | 714/38 |
| 2009/0293043 A1* | 11/2009 | Begel et al. | 717/122 |
| 2012/0089964 A1* | 4/2012 | Sawano | 717/124 |
| 2012/0216176 A1* | 8/2012 | Gaikwad et al. | 717/124 |
| 2015/0100832 A1* | 4/2015 | Nanjundappa | G06F 11/3688 714/38.14 |

OTHER PUBLICATIONS

Kim et al.; "Scenario based integration testing for object-oriented software development"; Nov. 16, 1999; Test Symposium, 1999, Proceedings; p. 283-288.*

\* cited by examiner

*Primary Examiner* — Li B Zhen
*Assistant Examiner* — Sen Chen

(57) ABSTRACT

Test case priorities are automatically determined based on the execution path of a software application that includes priority tags. By embedding the priority tags in the source code of the software application, the consistency and reliability of the test case priorities is improved compared to conventional, primarily manual approaches to determining test case priorities. Further, efficiency is increased by providing run-time feedback regarding test cases that facilitates identification of the highest priority test cases and corresponding test suite optimizations.

18 Claims, 5 Drawing Sheets

DETERMINING TEST CASE PRIORITIES BASED ON TAGGED EXECUTION PATHS

RELATED APPLICATION

Benefit is claimed under 35 U.S.C. 119(a)-(d) to Foreign application Serial No. 3791/CHE/2014 filed in India entitled "DETERMINING TEST CASE PRIORITIES BASED ON TAGGED EXECUTION PATHS", filed on Aug. 1, 2014, by VMware, Inc., which is herein incorporated in its entirety by reference for all purposes.

BACKGROUND

Typically testing and validating a software application involves executing a test suite of test cases that run the software application through various execution paths. Often the test cases are designed to test functional requirements or use cases (i.e., scenarios that represent expected customer goals in running the software application). Manually running a test suite for a complex software application and then interpreting the results is a time-consuming, error-prone, and repetitive task. Consequently, portions of the testing are often automated using a test harness-any combination of software and test data that executes the test cases in the test suite and generates test reports that summarize the results of executing the test cases in an intuitive fashion.

Test suites are often run to validate specific versions of software applications, known as "builds," either as part of the development cycle or to ensure the quality of software applications that are targeted for customer release. However, to comprehensively validate that a software application is both functionally correct and executes applicable use cases correctly may lead to test suites that include many different test cases and, consequently, unacceptably long test cycles (i.e., time required to run the test suites). Further, depending on the order in which test cases are run, detecting critical defects may be unnecessarily delayed.

In one attempt to reduce the test cycles times, the amount of test cases that are run for different purposes (e.g., internal development builds versus release builds) may be pruned and/or the test cases may be temporally ordered. Such pruning and reordering typically reflects the priorities of program managers who define the use cases and developers who understand the functional requirements and error-prone execution paths.

Although judiciously defining test case priorities may alleviate the time required to verify a build, defining the priorities is an error-prone process. For instance, if a test case exercises multiple use cases, then the overall priority of the test case may be misconstrued. Further, the priority for certain test cases may not be defined, or may be out-of-date and no longer accurately reflect the actual priority of the test cases. Manually defining priorities also leads to inconsistently defined test cases priorities, where one organization uses a different priority for one or more test cases. In general, using conventional, largely manual, approaches to defining test case priorities often leads to incorrect prioritization of test cases and, as a result, critical tests may not be executed or may be executed unacceptably late in the test cycle. Consequently, users resort to running test suites that include all available test cases, irrespective of the unreliable test case priorities, thereby increasing the overall time required to validate builds.

SUMMARY

One or more embodiments provide techniques to determine test case priorities based on priority tags included in the code of a software application. A method of determining a priority of a test case based on the path executed by the test case according to one embodiment includes the steps of running a test case to exercise a software application that includes priority tags; determining a test case result that reflects whether the test case passed or failed based on the running of the test case; determining a test case priority based on a set of one or more priority tags encountered along the path of the software application that is exercised while running the test case; and reporting the test case priority and the test case result.

Further embodiments of the present invention include a non-transitory computer-readable storage medium comprising instructions that cause a computer system to carry out one or more of the above methods as well as a computer system configured to carry out one or more of the above methods.

Advantageously, priority tagging enables clear, consistent, and automated determination of test case priorities. Further, the resulting reliability of the test case priorities enables insightful decisions regarding test suites, such as pruning test cases with lower priorities and reordering the test cases to run test cases with higher test case priorities before test cases with lower test case priorities.

DETAILED DESCRIPTION

Figure 1:
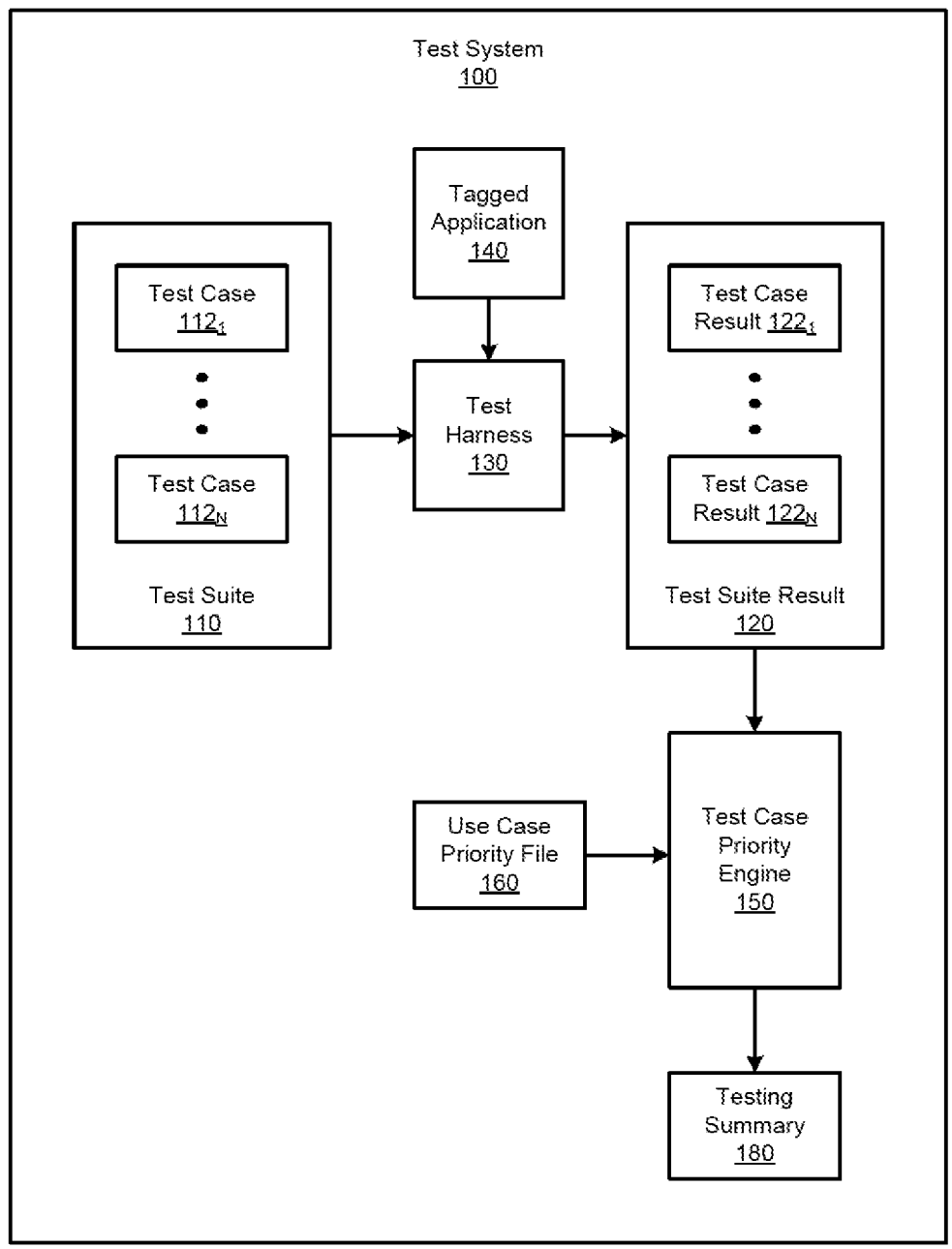
FIG. 1 is a block diagram of a test system that is configured to identify test case priorities according to one or more embodiments.

FIG. 1 is a block diagram of a test system 100 that is configured to identify test case priorities according to one or more embodiments. Test system 100 is implemented within a computer system that includes one or more central processing units (CPUs), memory, and other standard hardware components such as network interface controllers (not shown) that connect the computer system to a network. Applications stored in the memory and executing on the CPU include, inter alia, a tagged application 140, a test harness 130, and a test case priority engine 150. A test suite 110, a test suite result 120, a use case priority file 160, and a testing summary 180 are created and accessed by the applications and are also stored in the memory.

Tagged application 140 is an executable application that is compiled from application source code that includes "tags"—information that is added to the application source code and is retrievable at run-time (i.e., when tagged application 140 executes). For instance, Java® includes an annotation construct that may be used to implement tags. In order to verify the functionality of tagged application 140, test harness 130 executes test cases 112 included in test suite 110 and stores both the retrieved tag information and the test outcomes as test case results 122 included in test suite result 120. Notably, each test case 112 executes tagged application 140 and is designed to test one or more specific functionalities or use cases (i.e., system usage requirements) expected of tagged application 140. In alternative embodiments, test system 100 may include any number of tagged applications 140, and each test case 112 may execute any number of tagged applications 140.

Because exhaustively verifying the expected behavior of complex applications typically exceeds the time available to both create and execute test suites, typically test suites are tailored to cover the most important (i.e., highest priority) of expected behavior of applications. The priorities of functionality and use cases may be defined by various teams (e.g., project management, development, and marketing) and recorded, communicated, and updated in a primarily manual fashion. However, such a manual approach is error-prone and tedious. Further, since each test case may test numerous functionalities and use cases, defining the priority of test cases compounds the likelihood of errors in prioritization.

For this reason, embodiments provide mechanisms to automate portions of the prioritization process based on tags included in the source code of tagged application 140 and use case priorities defined in use case priority file 160. More specifically, test case priority engine 150 is designed to read and interpret use case priority file 160 and the retrieved tag information included in each test case result 122, and then systematically determine a priority for each test case 112. Test case priority engine 150 also reads the outcome included in each test case result 122, and outputs both the priority and the outcome of all test cases 112 included in test suite 110 as testing summary 180. Advantageously, users may review testing summary 180 and employ the test case priorities to streamline test suite 110, removing lower priority test cases 112 and/or reordering test cases 112 by priority to ensure that higher priority test cases 112 are run earlier than lower priority test cases 112.

Figure 2:
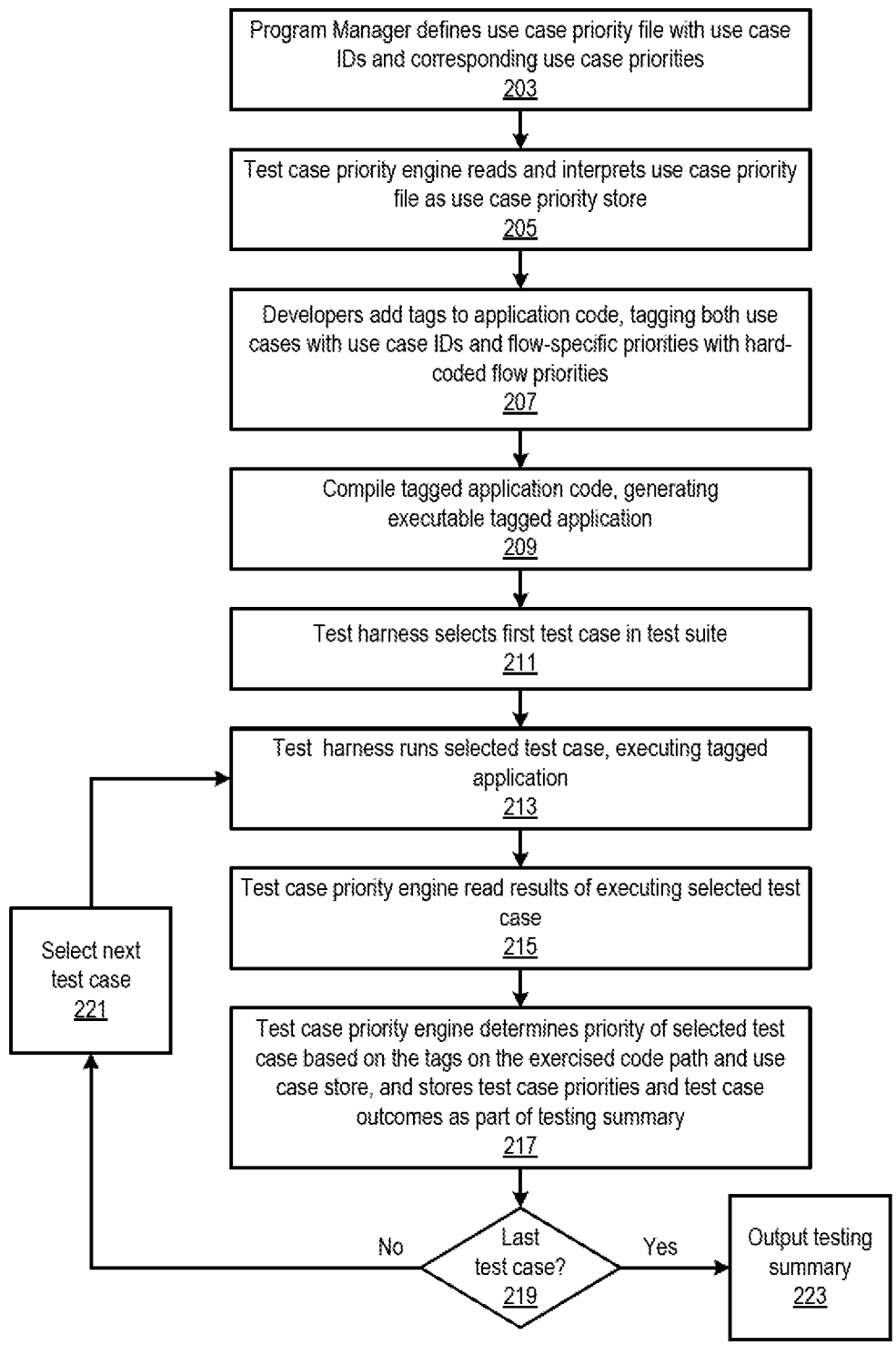
FIG. 2 depicts a flow diagram that illustrates a method that includes the steps of running a test suite that executes a tagged application, according to an embodiment.

FIG. 2 depicts a flow diagram that illustrates a method that includes the steps of running a test suite that executes a tagged application, according to an embodiment. In the embodiment illustrated herein, test suite 110 includes test cases 112 that exercise a single tagged application 140. In alternative embodiments, test suite 110 may include test cases 112 that exercise any number of tagged applications 140 in any combination.

This method begins at step 203, where a program manager (or other user tasked with defining overall prioritization) defines the priorities of use cases. The program manager stores use case identifiers and corresponding use case priorities in a text file-use case priority file 160. The use case identifiers may be any type of label that uniquely identifies each use case. In various embodiments, use case priority file 160 is a text file that may include any amount of additional information that may or may not be processed by test case priority engine 150. In some embodiments, use case priority file 160 may include descriptive summaries and versions in addition to the use case identifiers and the use case priorities. In such embodiments, test case priority engine 150 may use the versions to select the entry corresponding to the most recent version for each use case ID and discard entries of older versions so that they simply serve as a history of changes in use case priorities.

At step 205, test case priority engine 150 reads and processes use case priority file 160, generating a database—a use case priority store—that captures each use case ID and the corresponding use case priority. At step 207, developers (or other users tasked with creating application code) add use case priority tags to application code, tagging use cases represented by various code execution paths with the corresponding use case. More specifically, developers identify methods and/or interfaces in the application code that are the entry points for use cases, and then tag these starting points with the corresponding use case IDs.

In some embodiments, developers also add "flow" priority tags to application code (step 207). Flow priority flags do not correspond to anything in use case priority file 160, but instead contain a code description and an explicit priority. In general, the developers determine priorities for different internal branch methods and/or interfaces based on the priority of the flow, and tag the internal branch methods appropriately. For example, the developer may assign a lower priority to a positive scenario, such as reading an existing user name, and a higher priority to a negative scenario, such as identifying that a user name does not exist. In this fashion, both program managers and developers may define priorities in the same application code, the program managers indirectly via use case priority file 160 and use case priority tags, and the developers directly via flow priority tags.

At step 209, the developers compile the tagged application code, generating tagged application 140. Notably, both the use case priority tags and the flow priority tags are available when tagged application 140 executes. At step 211, test harness 130 selects the first test case 112 in test suite 110. Test suite 110 is designed to verify the expected behavior of tagged application 140. At step 213, test harness 130 runs selected test case 112, executing tagged application 140 and storing the results (including both the tag information and the outcome) as test case result 122. At step 215, test case priority engine 150 reads test case results 122.

At step 217, test case priority engine 150 determines the priority of selected test case 112 based on test case result 122 and use case priority file 160. In particular, since test case result 122 includes priority tag information corresponding to use cases and flows along the code path exercised by selected test case 112, test case priority engine 150 determines the overall priority of selected test case 112 based on the executed code path. Test case priority engine 150 may determine the overall priority of selected test case 112 in any technically feasible fashion that reflects the priority tag information. In some embodiments, test case priority engine 150 follows the method steps detailed in FIG. 3 to determine the overall priority of selected test case 112. Subsequently, test case priority engine 150 stores both the priority and output of selected test case 112 as part of testing summary 180.

At step 219, test harness 130 determines whether selected test case 112 is the last test case 112 in test suite 110. If, at step 219, test harness 130 determines that selected test case 112 is not the last test case 112 in test suite 110, then test harness 130 selects the next test case 112 in test suite 110 (step 221). Test harness 130 and test case priority engine 150 then re-execute steps 213-221 until test harness 130 and test case priority engine 150 have processed all test cases 112 in test suite 110. At step 219, if test harness 130 determines that selected test case 112 is the last test case 112 in test suite 110, then test case priority engine 150 outputs testing summary 180 (step 223), and this method ends.

Figure 3:
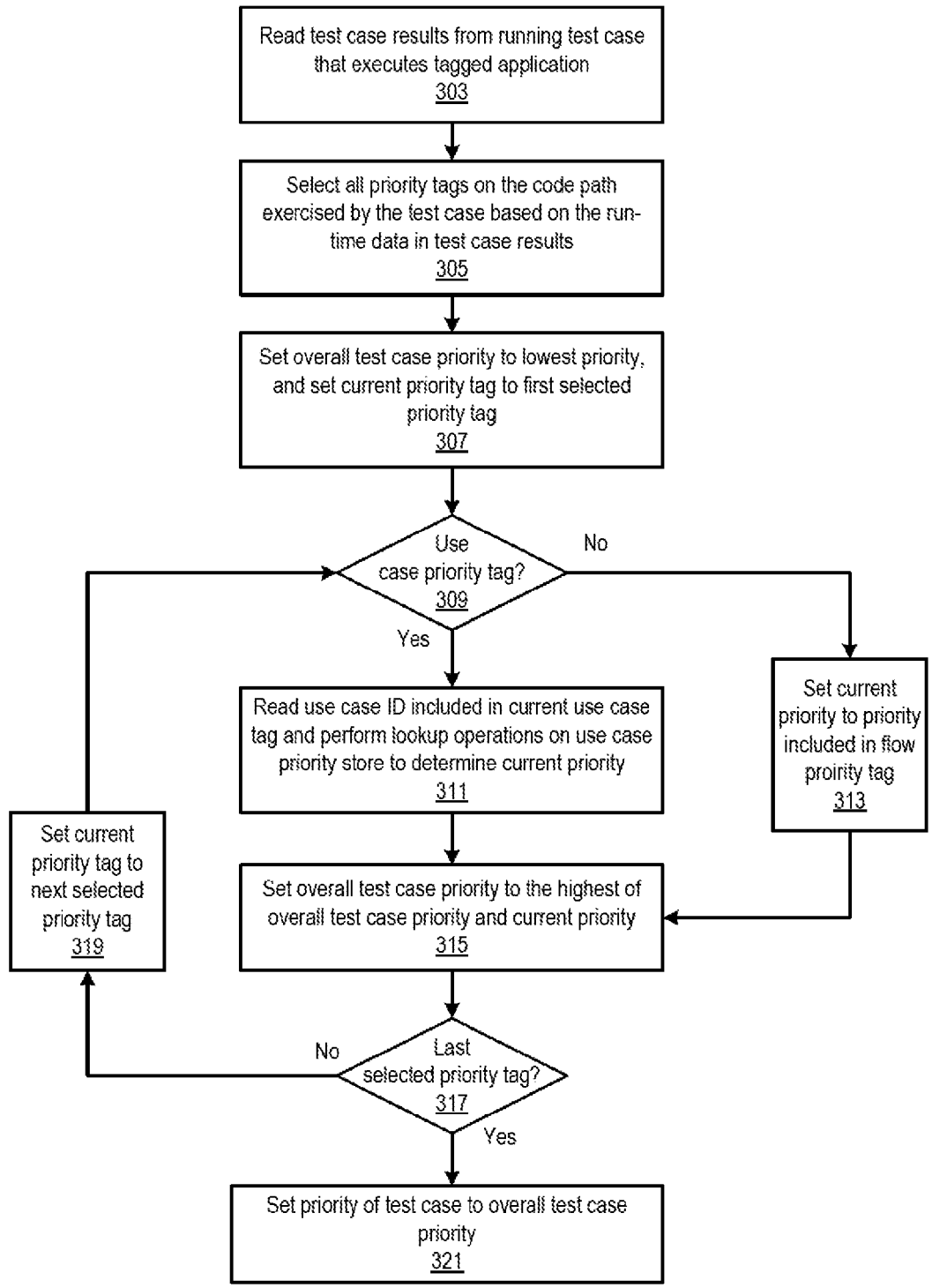
FIG. 3 depicts a flow diagram that illustrates a method that includes the steps of identifying a test case priority based on tags in an application and a use case priority store, according to an embodiment.

FIG. 3 depicts a flow diagram that illustrates a method that includes the steps of identifying a test case priority based on tags in an application and a use case priority store, according to an embodiment. In the embodiment illustrated herein, test case priority engine 150 is evaluating test case result 122 that includes the run-time information captured as test case 112 through execution of tagged application 140.

This method begins at step 303, where test case priority engine 150 reads test case result 122. Test case result 122 includes run-time data, such as the priority tags encountered on the code path executed in tagged application 140 by test case 112. At step 307, test case priority engine 150 selects all priority tags included in the code path executed in tagged application 140. At step 309, test case priority engine 150 sets an overall test case priority to the lowest priority and sets a current priority tag to the first priority tag in the selected priority tags.

At step 309, if test case priority engine 150 determines that the current priority tag is a use case priority tag, then this method proceeds to step 311. Test case priority engine 150 may determine whether current priority tag is a use case priority tag in any technically feasible fashion. In some embodiments, test case priority engine 150 compares a flag included in the current priority tag to a pre-defined use case priority flag. At step 311, test case priority engine 150 reads a use case ID included in the use case priority tag and performs lookup operations on a use case priority store—a database representing use case priority file 160—to determine the corresponding use case priority. Test case priority engine 150 then sets a current priority to this determined use case priority and this method continues to step 315.

If, at step 309, test case priority engine 150 determines that the current priority tag is not a use case priority tag, then the method proceeds to step 313. At step 313, test case priority engine 150 sets the current priority to a priority included in the priority tag. For instance, a flow priority tag includes an explicit priority value. This method then continues to step 315.

At step 315, if the current priority is higher than the overall test case priority, then test case priority engine 150 sets the overall test case priority to the current priority. In this fashion, the overall test case priority is the highest priority of all processed priority tags included in the execution path of tagged application 140. At step 317, test case priority engine 150 determines whether the current priority tag is the last tag in the selected priority tags. If, at step 317, test case priority engine 150 determines that the current priority tag is not the last tag in the selected priority tags, then test case priority engine 150 sets the current priority tag to the next priority tag in the selected priority tags (step 319). Test case priority engine 150 then re-executes steps 309-319 until test case priority engine 150 has processed all selected priority tags (i.e., all priority tags included in the executed code path) and, consequently, the overall test case priority is the highest priority of the selected priority tags. At step 317, if test case priority engine 150 determines that the current priority tag is the last tag in the selected priority tags, then test case priority engine 150 sets the priority of test case 112 to the overall test case priority (step 321), and this method ends.

Figure 4A:
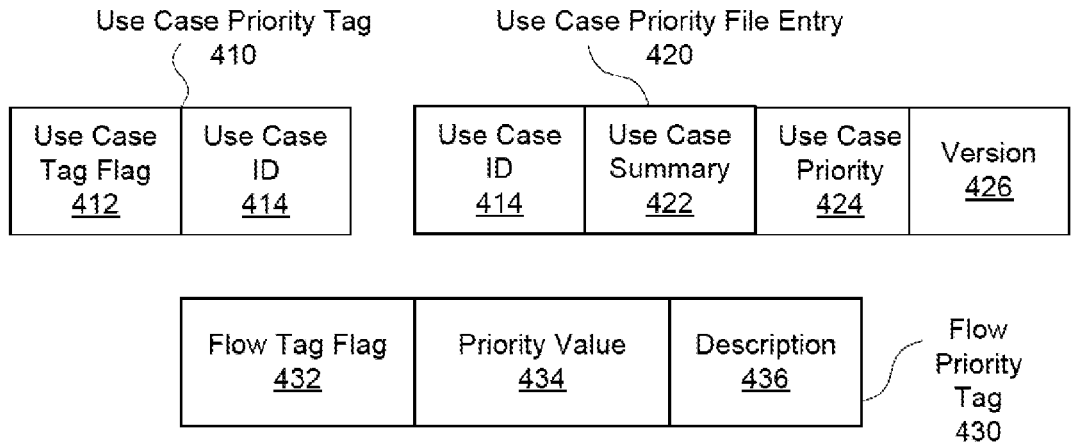
FIGS. 4A and 4B are conceptual diagrams that illustrate inputs and output of test case priority engine, according to one embodiment.
Figure 4B:
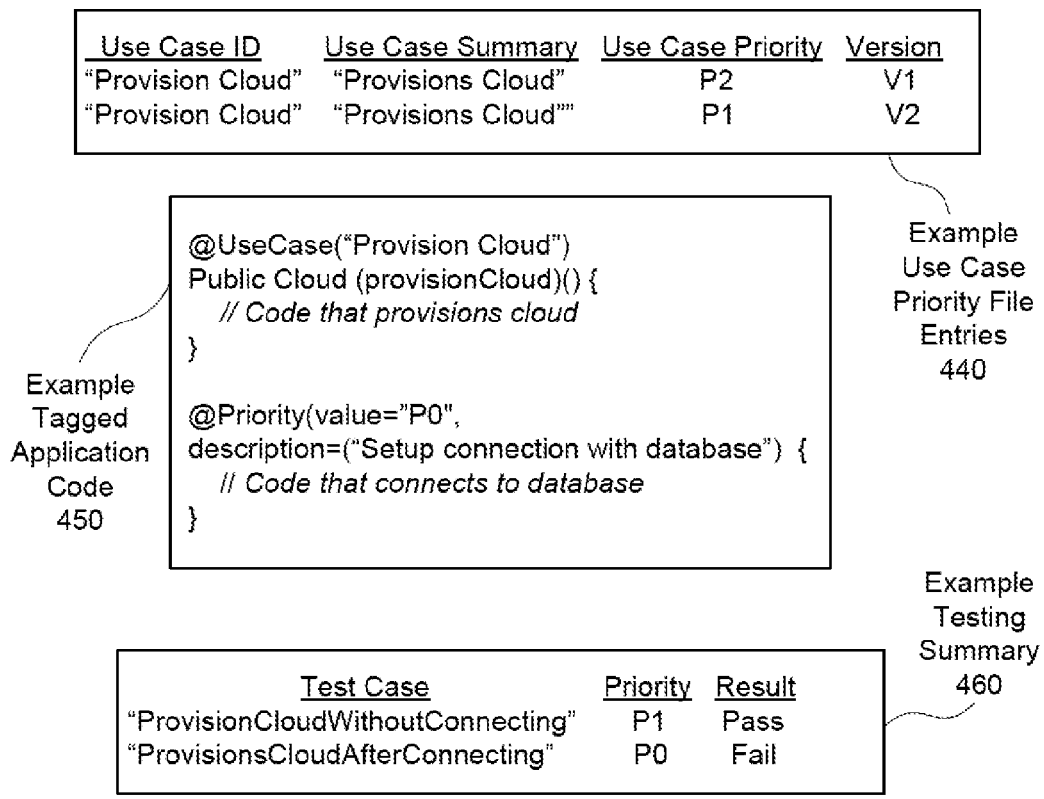

FIGS. 4A and 4B are conceptual diagrams that illustrate inputs and output of test case priority engine 150, according to one embodiment. FIG. 4A illustrates a use case priority tag 410, a use case priority file entry 420, and a flow priority tag 430.

As shown, use case priority tag 410 includes a use case test flag 412 and a use case ID 414. Use case test flag 412 is a predefined syntax included in the code of tagged application 140 that conveys that the associated tag is a priority tag for a use case and is defined in the context of use case priority file 160. For example, in some embodiments, use case test flag 412 is "@UseCase." Use case ID 414 is the unique identifier that represents the targeted use case. In operation, the program manager defines use case ID 414 as part of creating use case priority file 160. Subsequently, test case priority engine 150 reads use case priority file 160 and generates a corresponding database, known as a use case priority store.

Use case priority file entry 420 is one of the entries included in use case priority file 160. As shown, use case priority file entry 420 includes use case ID 414, a use case summary 422, a use case priority 424, and a version 426. Use case summary 422 is a description of the use case corresponding to use case ID 414. Use case priority 424 is the priority of the use case for version 426. Use case priority file 160 may include multiple versions for archive purposes. In operation, test case priority engine 150 reads all use case priority file entries 420 for each use case ID 414 and determines the priority of the use case corresponding to use case ID 414 based on the most recent version 426.

Flow priority tag 430 includes a flow tag flag 432, a priority value 434, and a description 436. Flow tag flag 432 is a predefined syntax included in the code of tagged application 140 that conveys that the associated tag is a flow priority tag that is inserted by the developer to define a priority of a particular code branch, referred to herein as a "flow priority." For example, in some embodiments, flow tag flag 432 is "@Priority." Priority value 434 is the stand-alone priority associated with the tagged code branch of tagged application 140. Description 436 is a descriptive summary of the functionality of the code branch tagged with the flow priority tag 430.

In alternative embodiments, use case priority tag 410, use case priority file entry 420, and/or flow priority tag 430 include different fields and are represented by different syntaxes. For instance, use case priority file entry 420 may include only use case ID 414 and use case priority 424. Similarly, flow priority tag 430 may include only flow tag 432 and priority value 434. In some embodiments, test case priority engine 150 include functionality to further process additional information included in use case priority tag 410, use case priority file entry 420, and/or flow priority tag 430. For example, in some embodiments, test case priority engine 150 reads details, such as use case summary 422 and description 436, regarding each use case priority tag 410 and each flow priority tag 430 included in the execution path of tagged application 140 that is executed by each test case 112. Subsequently, test case priority engine 150 outputs these details in a use-friendly fashion along with the priority and outcome of test case 112 as part of testing summary 180.

FIG. 4B illustrates example use case priority file entries 440, example tagged application code 450, and example testing summary 460. For explanatory purposes, a program manager includes example use case priority file entries 440 in use case priority file 160, and a developer compiles application code that includes example tagged application code 450 as tagged application 140. Subsequently, test harness 130 runs test suite 110 that includes test case $112_1$ "ProvisionCloudWithoutConnecting" and test case $112_2$ "ProvisionCloudAfterConnecting." Both test case $112_1$ and test case $112_2$ execute tagged application 140, and test harness 130 generates test case result $122_1$ and test case result $122_2$ respectively. After test harness 130 generates test case result $122_1$, test case priority engine 150 reads test case result $122_1$ and determines the priority of test case $112_1$ based on example use case priority files entries 440. Similarly, after test harness 130 generates test case result $122_2$, test case priority engine 150 reads test case result $122_2$ and determines the priority of test case 112₂ based on example use case priority files entries 440.

Example use case priority file entries 440 include two entries, both corresponding to use case ID 414 "Provision Cloud." The first entry includes use case priority 424 "P2" for version 426 "V1." The second entry includes use case priority "P1" for version 426 "V2." As test case priority engine 150 processes use case priority file 160, test case priority engine 150 determines that the second entry corresponds to a more recent version 426 and, consequently, the use case priority 424 for use case ID 414 "Provision Cloud" is priority 424 "P1."

Example tagged application code 450 includes an entry method "provisionCloud" that is marked with use case priority tag 410 "(@UseCase("Provision Cloud")." Example tagged application code 450 also includes a branch method that is marked with flow priority tag 430 "@Priority(value="P0",description("Setup connection with database")." Although not shown, test code path executed by test case 112₁ "ProvisionCloudWithoutConnecting" includes the entry method "provisionCloud," but not the branch method that sets up the connection with the database. By contrast, the test code path executed by test case 112₂ "ProvisionCloudAfterConnecting" includes the entry method "provisionCloud" and the branch method that sets up the connection with the database.

Example testing summary 460 includes the test case priority for both test case 112₁ "ProvisionCloudWithoutConnecting" and test case 112₂ "ProvisionCloudAfterConnecting." For explanatory purposes, P0 is the highest priority. For each test case 112, the test case priority is the highest priority of all use case priority tags 410 and flow priority tags 430 included in the path executed by test case 112. Consequently, as shown, the priority for test case 112₁ "ProvisionCloudWithoutConnecting" is "P1," and the priority for test case 112₂ "ProvisionCloudAfterConnecting" is "P0." Advantageously, based on testing summary 460, the user may elect to reorder the test cases 112 in test suite 110—running higher priority test case 112₂ before test case 112₁. Alternatively, to tailor test suite 110 to only include the highest priority test cases 112, the user may remove test case 112₁ from test suite 110, thereby reducing the time required to run test suite 110.

Figure 5:
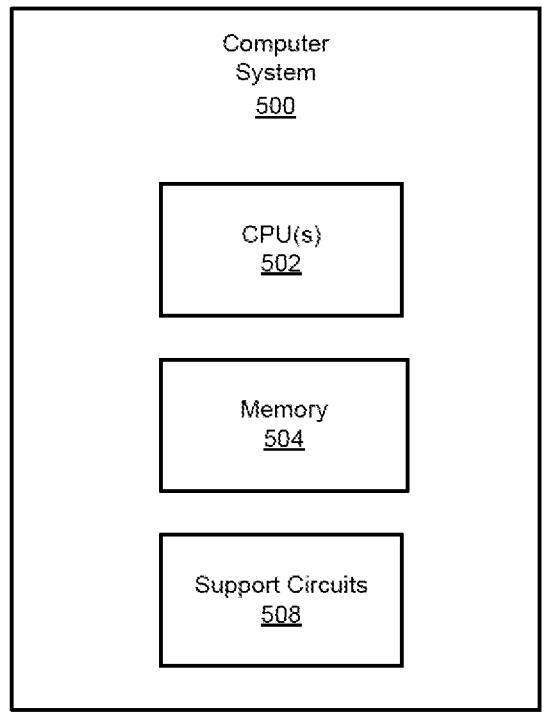
FIG. 5 is a block diagram depicting a computer system according to an example implementation.

FIG. 5 is a block diagram depicting a computer system 500 according to an example implementation. Computer system 500 implements test system 100 and includes one or more central processing units (CPUs) 502, memory 504, and support circuits 508

Each of CPUs 502 can include any microprocessor known in the art and can execute instructions stored on computer readable storage, such as memory 504 or mass storage (not shown). Memory 504 can include various volatile and/or non-volatile memory devices, such as random access memory (RAM), read only memory (ROM), and the like. Mass storage can include various persistent storage devices, such as hard disc drives, solid state disk drives, and the like. Instructions for performing the various methods and techniques described above can be stored in memory 504 and/or mass storage for execution by CPUs 502. Support circuits 508 include various circuits used to support operation of a computer system as known in the art, such as network interface controllers (not shown) that connect computer system 500 to a network.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of determining a priority of a test case based on one or more priority tags encountered in a path in a software application executed by the test case, wherein a test suite includes the test case, the method comprising:
running a test case to execute the software application, the software application including executable code compiled from source code, the source code including priority tags that are retrievable from the executable code;
determining a test case result that reflects whether the test case passed or failed based on the running of the test case;
determining a test case priority based on a set of one or more priority tags retrieved from the executable code and encountered along the path in the software application that is executed while running the test case, wherein at least one priority tag in the set includes a use case identifier that is used in determining the test case priority, wherein the test case priority is determined based on use case identifiers encountered in the priority tags during execution of the test case by reading the set of one or more priority tags to determine corresponding use case identifiers;
performing look up operations on a use case priority database that maps use case identifiers encountered during execution to use case priorities;
calculating the test case priority based on the use case priorities;
reporting the test case priority and the test case result; and
modifying the test suite to change the order in which the test case is run based on the determined test case priority.

2. The method of claim 1, further comprising:
generating the use case priority database based on a use case priority text file.

3. The method of claim 1, wherein calculating the test case priority comprises:
performing comparison operations that identify the highest of the use case priorities.

4. The method of claim 1, wherein performing the look up operations for a first use case identifier comprises:
performing a first look up operation that associates the first use case identifier with both a first versioned use case priority and a first version number;
performing a second look up operation that associates the first use case identifier with both a second versioned use case priority and a second version number; and
if the first version number specifies a more recent version than the second version number, then setting the use case priority for the first use case to the first versioned use case priority; or
if the first version number does not specify a more recent version that the second version number, then setting the use case priority for the first use case to the second versioned use case priority.

5. The method of claim 1, wherein determining the test case priority comprises:
for each priority tag in the set of one or more priority tags, if the priority tag specifies a use case identifier, then performing look up operations on a use case priority database that maps the use case identifier to a use case priority; or if the priority tag does not specify a use case identifier, then reading the priority tag to determine a flow priority; and
calculating the test case priority based on both use case priorities and flow priorities.

6. The method of claim 5, wherein calculating the test case priority comprises:
performing comparison operations that identify the higher of a highest use case priority and a highest flow priority.

7. The method of claim 5, further comprising:
reporting at least one of the use case priorities and the flow priorities irrespective of whether the use case priorities or the flow priorities matches the test case priority.

8. The method of claim 5, wherein the use case priority database also maps the use case identifier to a use case summary and further comprising:
reporting the use case summary.

9. The method of claim 1, wherein at least one of the priority tags in the set of one or more priority tags corresponds to an interface or method in the software application that is an entry point for a use case.

10. The method of claim 1, wherein at least one of the priority tags in the set of priority tags corresponds to an internal branch method in the software application.

11. The method of claim 1, wherein the one or more of the priority tags includes a descriptive summary and further comprising reporting the descriptive summary.

12. The method of claim 1, wherein the priority tags are annotations in the source code.

13. The method of claim 1, further comprising:
prior to running the test case, compiling the source code to generate the software application.

14. The method of claim 1, further comprising:
determining that the test case priority is relatively low and, in response thereto, modifying the test suite to remove the test case.

15. A non-transitory computer-readable storage medium comprising instructions, which when executed in a computer system, causes the computer system to carry out the steps of:
running a test case to execute a software application, the software application including executable code compiled from source code, the source code including priority tags that are retrievable from the executable code;
determining a test case result that reflects whether the test case passed or failed based on the running of the test case;
determining a test case priority based on a set of one or more priority tags retrieved from the executable code and encountered along a path in the software application that is executed while running the test case, wherein at least one priority tag in the set includes a use case identifier that is used in determining the test case priority, wherein the test case priority is determined based on use case identifiers encountered in the priority tags during execution of the test case by reading the set of one or more priority tags to determine corresponding use case identifiers;

performing look up operations on a use case priority database that maps use case identifiers encountered during execution to use case priorities;

calculating the test case priority based on the use case priorities encountered in the priority tags during execution;

reporting the test case priority and the test case result; and modifying a test suite to change the order in which the test case is run based on the determined test case priority.

16. The non-transitory computer-readable storage medium of claim 15, wherein determining the test case priority comprises:

for each priority tag in the set of one or more priority tags, if the priority tag specifies a use case identifier, then performing look up operations on a use case priority database that maps the use case identifier to a use case priority; or if the priority tag does not specify a use case identifier, then reading the priority tag to determine a flow priority; and performing comparison operations that identify the higher of a highest use case priority and a highest flow priority.

17. A test system, comprising:

a memory including a program for determining a priority of a test case based on one or more priority tags encountered in a path in a software application executed by the test case; and a processor, coupled to the memory, configured to execute the program to:

run the test case to execute the software application, the software application including executable code compiled from source code, the source code including priority tags that are retrievable from the executable code;

determining a test case result that reflects whether the test case passed or failed based on the running of the test case, determining a test case priority based on a set of one or more priority tags retrieved from the executable code and encountered along the path in the software application that is executed while running the test case, wherein at least one priority tag in the set includes a use case identifier that is used in determining the test case priority, wherein the test case priority is determined based on use case identifiers encountered in the priority tags during execution of the test case by reading the set of one or more priority tags to determine corresponding use case identifiers;

performing look up operations on a use case priority database that maps use case identifiers encountered during execution to use case priorities;

calculating the test case priority based on the use case priorities;

reporting the test case priority and the test case result; and modifying a test suite to change the order in which the test case is run based on the determined test case priority.

18. The test system of claim 17, wherein determining the test case priority comprises:

for each priority tag in the set of one or more priority tags, if the priority tag specifies a use case identifier, then performing look up operations on a use case priority database that maps the use case identifier to a use case priority; or if the priority tag does not specify a use case identifier, then reading the priority tag to determine a flow priority; and performing comparison operations that identify the higher of a highest use case priority and a highest flow priority.

\* \* \* \* \*